United States Patent
Wang et al.

(10) Patent No.: US 12,122,602 B2
(45) Date of Patent: Oct. 22, 2024

(54) ELECTRONIC DEVICE AND METHOD FOR MANAGING STORAGE OF MATERIALS

(71) Applicant: TRIPLE WIN TECHNOLOGY(SHENZHEN) CO. LTD., Shenzhen (CN)

(72) Inventors: Ying-Jia Wang, Shenzhen (CN); Jin-Song Chen, Shenzhen (CN)

(73) Assignee: TRIPLE WIN TECHNOLOGY(SHENZHEN) CO. LTD., Shenzhen (CN)

(*) Notice: Subject to any disclaimer, the term of this patent is extended or adjusted under 35 U.S.C. 154(b) by 710 days.

(21) Appl. No.: 17/363,292

(22) Filed: Jun. 30, 2021

(65) Prior Publication Data
US 2021/0403238 A1 Dec. 30, 2021

(30) Foreign Application Priority Data
Jun. 30, 2020 (CN) .......................... 202010618432.4

(51) Int. Cl.
*B65G 1/04* (2006.01)
*B65G 1/137* (2006.01)

(52) U.S. Cl.
CPC ......... *B65G 1/1371* (2013.01); *B65G 1/0485* (2013.01); *B65G 2203/0216* (2013.01); *B65G 2203/0233* (2013.01)

(58) Field of Classification Search
CPC ................ B65G 1/1371; B65G 1/0485; B65G 2203/0216; B65G 2203/0233; B65G 1/04; B65G 1/045; G06Q 10/087; G06K 17/0029
See application file for complete search history.

(56) References Cited

U.S. PATENT DOCUMENTS

| | | | |
|---|---|---|---|
| 8,751,035 B2* | 6/2014 | Janet .................... | G07F 9/002 700/229 |
| 9,122,783 B2* | 9/2015 | Carson ................. | G06Q 30/018 |
| 11,735,304 B2* | 8/2023 | Chambers ............. | G07F 9/006 53/473 |

(Continued)

FOREIGN PATENT DOCUMENTS

| | | |
|---|---|---|
| CN | 103870948 | 6/2014 |
| CN | 110909829 | 3/2020 |

(Continued)

*Primary Examiner* — Patrick H Mackey
(74) *Attorney, Agent, or Firm* — ScienBiziP, P.C.

(57) ABSTRACT

A method for managing storage of materials implemented in an electronic device to ensure that earliest-stored materials are removed from storage positions, first controls a scanning device to scan batch code and obtains batch information of the material when an inlet of the electronic device is required to receive the batch of material. A serial number of a storage position is associated with the batch information and a storage time of the batch of material in the storage position is recorded. The serial number of the storage position storing the batch of material according to the batch information is determined when a material-request is received and a transmission track is controlled to transfer the batches of material which having earliest recorded storage times one by one to the outlet, so as to release the batches of material from the storage position.

13 Claims, 4 Drawing Sheets

(56) References Cited

U.S. PATENT DOCUMENTS

| | | | | |
|---|---|---|---|---|
| 11,787,632 | B2* | 10/2023 | Manning | G07F 11/54 |
| | | | | 700/218 |
| 11,945,652 | B2* | 4/2024 | Shultz | G07F 9/026 |
| 2004/0267402 | A1* | 12/2004 | Speckhart | G07F 17/12 |
| | | | | 700/213 |
| 2006/0192001 | A1* | 8/2006 | Shaffer | G06Q 10/087 |
| | | | | 235/382 |
| 2007/0261997 | A1* | 11/2007 | Cassady | B07C 5/3412 |
| | | | | 209/3.3 |

FOREIGN PATENT DOCUMENTS

| | | |
|---|---|---|
| TW | I433040 | 4/2014 |
| TW | 201721533 | 6/2017 |

\* cited by examiner

ELECTRONIC DEVICE AND METHOD FOR MANAGING STORAGE OF MATERIALS

CROSS-REFERENCE TO RELATED APPLICATIONS

This application claims priority to Chinese Patent Application No. 202010618432.4 filed on Jun. 30, 2020, the contents of which are incorporated by reference herein.

FIELD

The subject matter herein generally relates to storage control, and particularly to an electronic device and method for managing storage of materials.

BACKGROUND

In order to ensure normal operation of a manufacture process, materials are usually stored in advance. Therefore, management of such materials is important. However, due to lack of smart material management systems, the materials are usually managed manually, which can result in materials mixture, and if not easily distinguishable in appearance and storage time, materials with long or the longest storage time are not used in time and may be wasted by being scrapped.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the presented disclosure.

The presented disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as Java, C, or assembly. One or more software instructions in the modules can be embedded in firmware, such as in an EPROM. The modules described herein can be implemented as either software and/or hardware modules and can be stored in any type of non-transitory computer-readable medium or another storage device. Some non-limiting examples of non-transitory computer-readable media include CDs, DVDs, BLU-RAY, flash memory, and hard disk drives. The term "comprising" means "including, but not necessarily limited to"; it in detail indicates open-ended inclusion or membership in a so-described combination, group, series, and the like.

Figure 1:
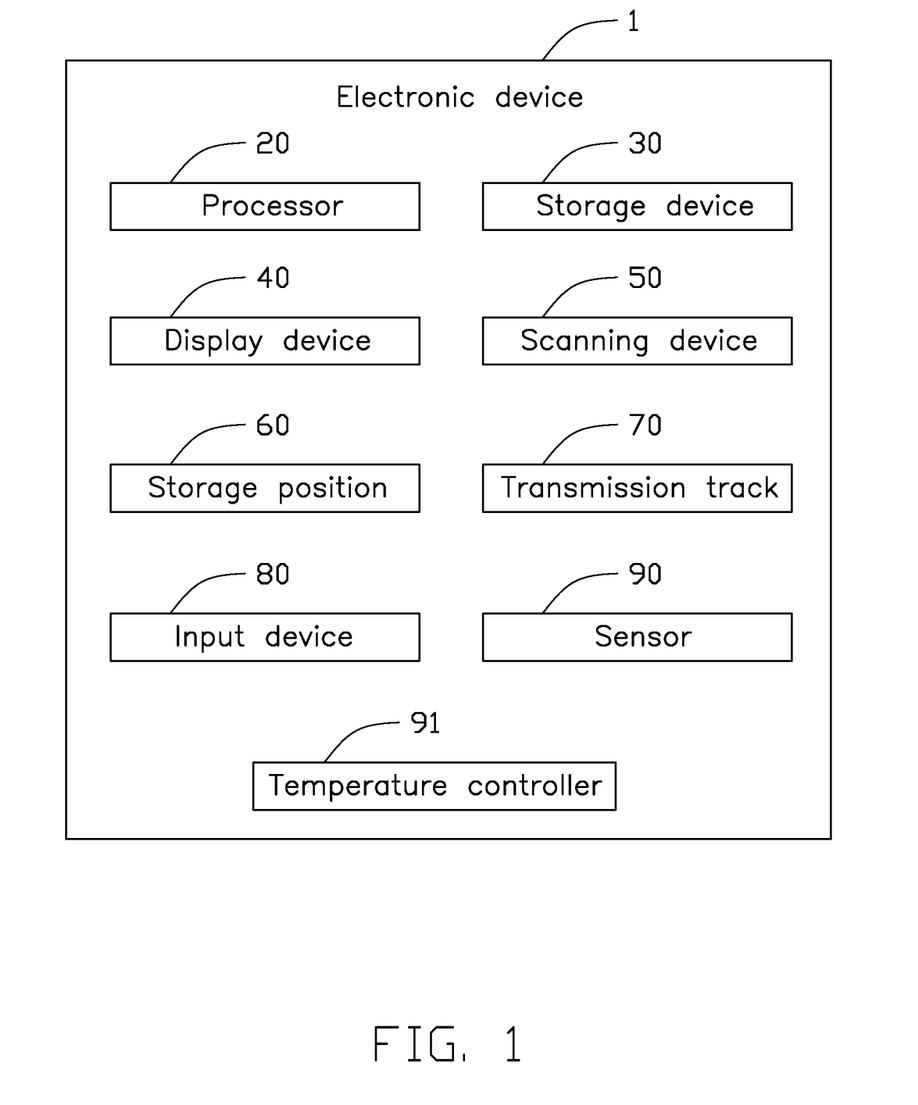
FIG. 1 is a block diagram of an embodiment of an application environment of an electronic device according to the present disclosure.
Figure 2:
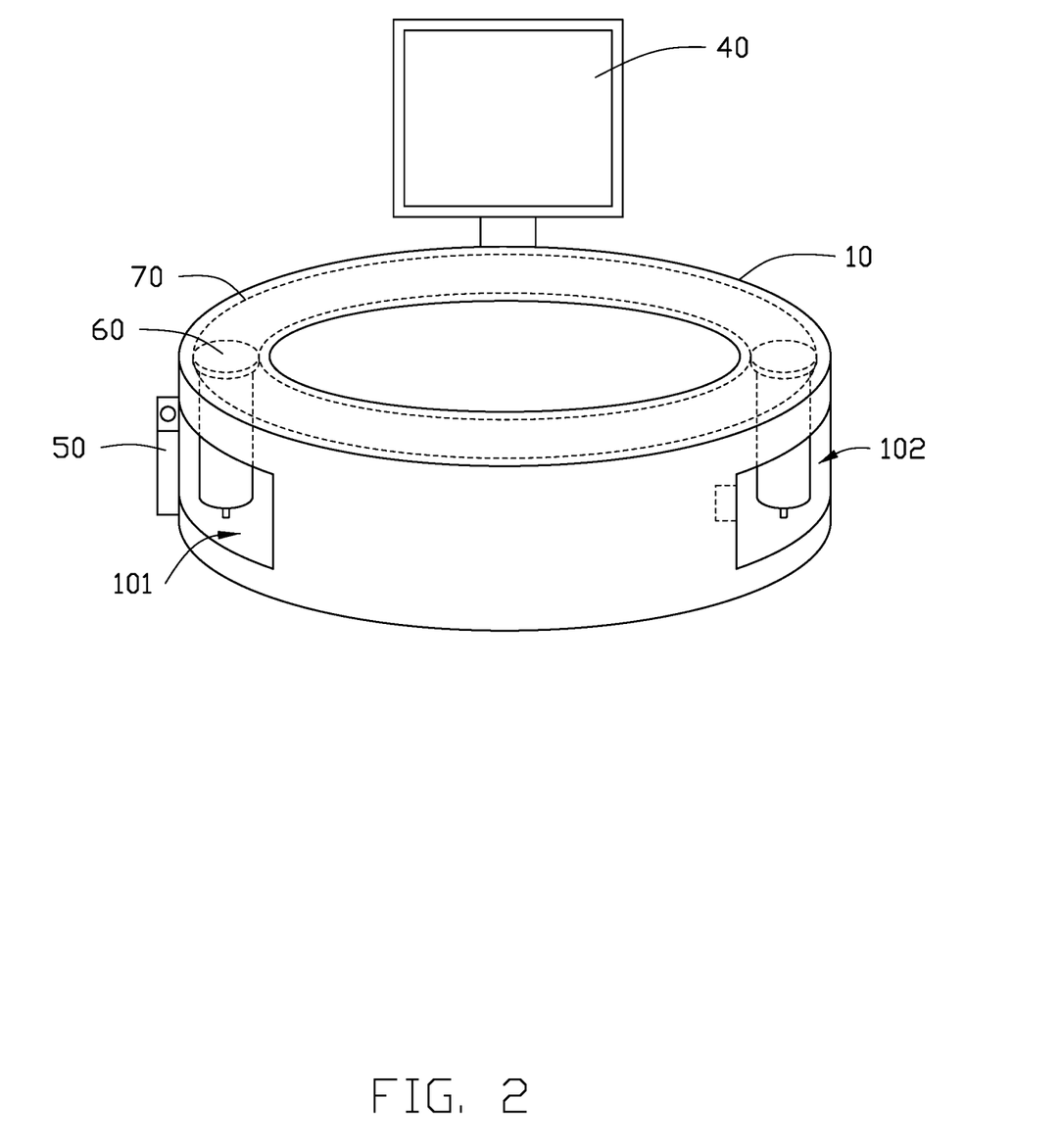
FIG. 2 is a schematic view of an embodiment of an electronic device according to the present disclosure.

FIGS. 1-2 illustrate an electronic device (electronic device 1), the electronic device 1 can be a box for storing batches of materials. The electronic device 1 includes, but is not limited to, a casing 10, a processor 20, a storage device 30, a display device 40, a scanning device 50, a plurality of storage positions 60, a transmission track 70, and an input device 80. The plurality of storage positions 60 are arranged on the transmission track 70, and the transmission track 70 is arranged in the casing 10. FIGS. 1-2 illustrates only one example of the electronic device 1. Other examples can include more or fewer components than as illustrated or have a different configuration of the various components.

In one embodiment, a shape of the casing 10 matches a shape of the transmission track 70. The casing 10 at least includes an inlet 101 and an outlet 102. The inlet 101 and an outlet 102 are arranged on a side of the casing 10 respectively.

The processor 20 can be a central processing unit (CPU), a microprocessor, or other data processor chip that performs functions in the electronic device 1.

In one embodiment, the storage device 30 can include various types of non-transitory computer-readable storage mediums. For example, the storage device 20 can be an internal storage system, such as a flash memory, a random access memory (RAM) for the temporary storage of information, and/or a read-only memory (ROM) for permanent storage of information. The storage device 30 can also be an external storage system, such as a hard disk, a storage card, or a data storage medium.

In one embodiment, the storage device 30 stores serial numbers and stored batch information of the material in the plurality of the storage positions. The batch information includes a batch name, a batch code, and an ID of the batches of material.

In one embodiment, the scanning device 50 can be a barcode scanning gun, the scanning device 50 is configured to scan a code on the batch of material. The scanning device 50 is arranged at the inlet 101 of the casing 10. The display device 40 can be a LCD (Liquid Crystal Display) screen, and is configured to display the batch information when the scanning device 50 scans the code on the batch of material. The input device 80 can be a keyboard or a touch screen, and is configured to input the batch information in response to user operations.

In one embodiment, the storage position 60 is configured to store the batches of materials, and the shapes and the sizes of the storage positions 60 match the shapes and the sizes of the batches of material to be stored. For example, the batches of material can be a needle tube glue. The storage positions 60 are arranged on the transmission track 70 and can move with the transmission track 70. The storage position 60 defines a clamping mechanism, an adsorption mechanism, or a receiving mechanism (not shown in figures), so as to facilitate access for and to the batches of material.

When the electronic device 1 receives batch of material to be stored from the inlet 101, the scanning device 50 scans the code of the batch of material and obtains the batch information, and stores the obtained batch information into the storage device 30.

When the batch of material is required to be stored into a storage position 60, the processor 20 associates the serial number of one of the number of the storage positions 60 with the batch information, records the storage time of the batch of material in the storage position 60 associated with the serial number, and stores the recorded storage time into the storage device 30. In one embodiment, a format of the storage time can be year-month-day-hour-minute-second, for example, the storage time can be 2021-06-20-14-02-38.

When a preset number of batches of materials are required to be removed, the user can input the batch information of the batches of material to be removed, such as the batch name of the batches of material or the ID of the batches of material, through the input device 80. The processor 20 determines the serial numbers of the storage positions 60 of the number of storage positions which are storing the batches of material to be removed according to the input batch information, and controls the transmission track 70 to transfer the batches of material in the preset number of the storage positions 60 which having earliest recorded storage times one by one to the outlet 102, and release the batches of material in the preset number from the outlet 102, so as to remove the preset number of batches of materials from the storage positions 60 through the outlet 102.

In detail, the processor 20 obtains a storage time of the batch of material in the storage position 60 when the storage position 60 reaches the position of the outlet 102, and if a ranked value of the storage time of the stored batch of material in the storage position 60 is less than or equal to a value of the preset number, the processor 20 controls the storage position 60 to release the stored batch of material to the position of the outlet 102, thus, the batches of material in the preset number of the storage positions 60 which having earliest recorded storage times are released one by one to the outlet 102.

For example, the electronic device 1 includes four storage positions 60, each of the four storage positions 60 stores the batches of material. When three batches of material are required to be removed, the processor 20 determines that the serial numbers of the four storage positions 60 which are storing the batches of material are B01, B02, B03, and B04, according to associations between the serial numbers of the storage positions 60 and the batch information. A storage time of the batch of material in the storage position 60 corresponding to the serial number B01 is 2021-06-25-15-14-25, a storage time of the batch of material in the storage position 60 corresponding to the serial number B02 is 2021-06-26-08-55-15, a storage time of the batch of material in the storage position 60 corresponding to the serial number B03 is 2021-06-27-11-06-18, and a storage time of the batch of material in the storage position 60 corresponding to the serial number B04 is 2021-06-28-17-23-10. According to an order of time, the storage time of the batch of material in the storage position 60 corresponding to the serial number B01 ranks number one, the storage time of the batch of material in the storage position 60 corresponding to the serial number B02 ranks number two, the storage time of the batch of material in the storage position 60 corresponding to the serial number B03 ranks number three, the storage time of the batch of material in the storage position 60 corresponding to the serial number B04 ranks number four. That is, a ranked value of the storage time of the batch of material in the storage position 60 corresponding to the serial number B01 is one, a ranked value of the storage time of the batch of material in the storage position 60 corresponding to the serial number B02 is two, a ranked value of the storage time of the batch of material in the storage position 60 corresponding to the serial number B03 is three, a ranked value of the storage time of the batch of material in the storage position 60 corresponding to the serial number B04 is four. A value of the preset number of batches of material determined to be removed is three, the three storage positions 60 corresponding to the serial numbers B01-B03 are having the earliest recorded storage times, thus, the ranked values of the storage times of the batches of material in the three storage positions 60 corresponding to the serial numbers B01-B03 are less than or equal to the value of the preset number, the processor 20 controls the transmission track 70 to transfer the batches of material in the three storage positions 60 corresponding to the serial numbers B01-B03 one by on to the outlet 102.

As illustrated in FIG. 2, in one embodiment, the casing 10 and the transmission rail 70 are annular. When the electronic device 1 receives new batches of materials to be stored, the processor 20 controls the transmission track 70 to rotate and transfer the storage position 60 that is empty to the position of the inlet 101. When the batches of material are required to be removed, the processor 20 controls the transmission track 70 to rotate and transfer the storage positions 60 which are storing the batches of material determined to be removed to the position of the outlet 102.

In one embodiment, the electronic device 1 further includes a sensor 90. The sensor 90 is arranged at a position of the outlet 102. A label is attached to the storage position 60 for recording the serial number of the storage position 60. The sensor 90 obtains the serial number of the storage position 60 by reading the label when the storage position 60 reaches the position of the outlet 102.

In one embodiment, after the serial numbers of the storage positions 60 storing the batches of material to be removed are determined, the processor 20 controls the transmission track 70 to rotate and drive the number of storage positions 60 to move. The number of storage positions 60 move with the transmission track 70, and a moving track of each of the storage positions 60 is also annular.

When each of the number of the storage position 60 reaches the position of the outlet 102, and meanwhile reaches the position of the sensor 90, the sensor 90 detects the serial number of the storage position 60 and transmits the detected serial number to the processor 20. The processor 20 determines whether the serial number is the same as the serial number of the storage position 60 storing the batches of material. If the serial number is determined to be the same as the serial number of the storage position 60 storing the batches of material, the processor 20 obtains a storage time of the batch of material in the storage position 60 from the storage device 30. If the ranked value of the obtained storage time of the batch of material in the storage position 60 is less than or equal to the value of the preset number, the processor 20 controls the storage position 60 to release the stored batch of material to the position of the outlet 102, so as to facilitate the user to take out the batch of material.

For example, if the value of the preset number is three and the number of storage positions 60 which are currently storing the batches of material is ten, the storage time of the material in the storage positions 60 currently obtained by the sensor 90 is ranked number three in the ten storage positions 60, that is, the ranked value (three) of the storage time is less than or equal to the value (three) of the preset number.

In one embodiment, when the storage position 60 releases the stored batch of material to the position of the outlet 102, the processor 20 deletes an association between the serial number of the storage position 60 that released the batch of material and the batch information, and marks the storage position 60 that released the stored batch of material as the storage position that is empty.

In one embodiment, the electronic device 1 further includes a temperature controller 91. The temperature controller 91 may be a refrigeration device, and is configured to adjust the temperature in the electronic device 1 according to the storage requirements of the batches of material. If the batches of material requires to be refrigerated in a certain temperature range, the temperature controller 91 is turned on to adjust the temperature in the electronic device 1 to the temperature range, so as to comply with the refrigeration requirements of the material. For example, when the batch of material is liquid glue, the glue requires to be refrigerated in a temperature range of 0-40 degrees centigrade, and when the liquid glue is stored in the electronic device 1, the temperature controller 91 is turned on to adjust the temperature in the electronic device 1 to the temperature range of 0-40 degrees centigrade.

In other embodiments, the electronic device 1 does not include the temperature controller 91, and when the batches of material requires to be refrigerated, the electronic device 1 may be placed in a refrigerator or a refrigerator to meet the refrigeration requirements of the batches of material.

Figure 3:
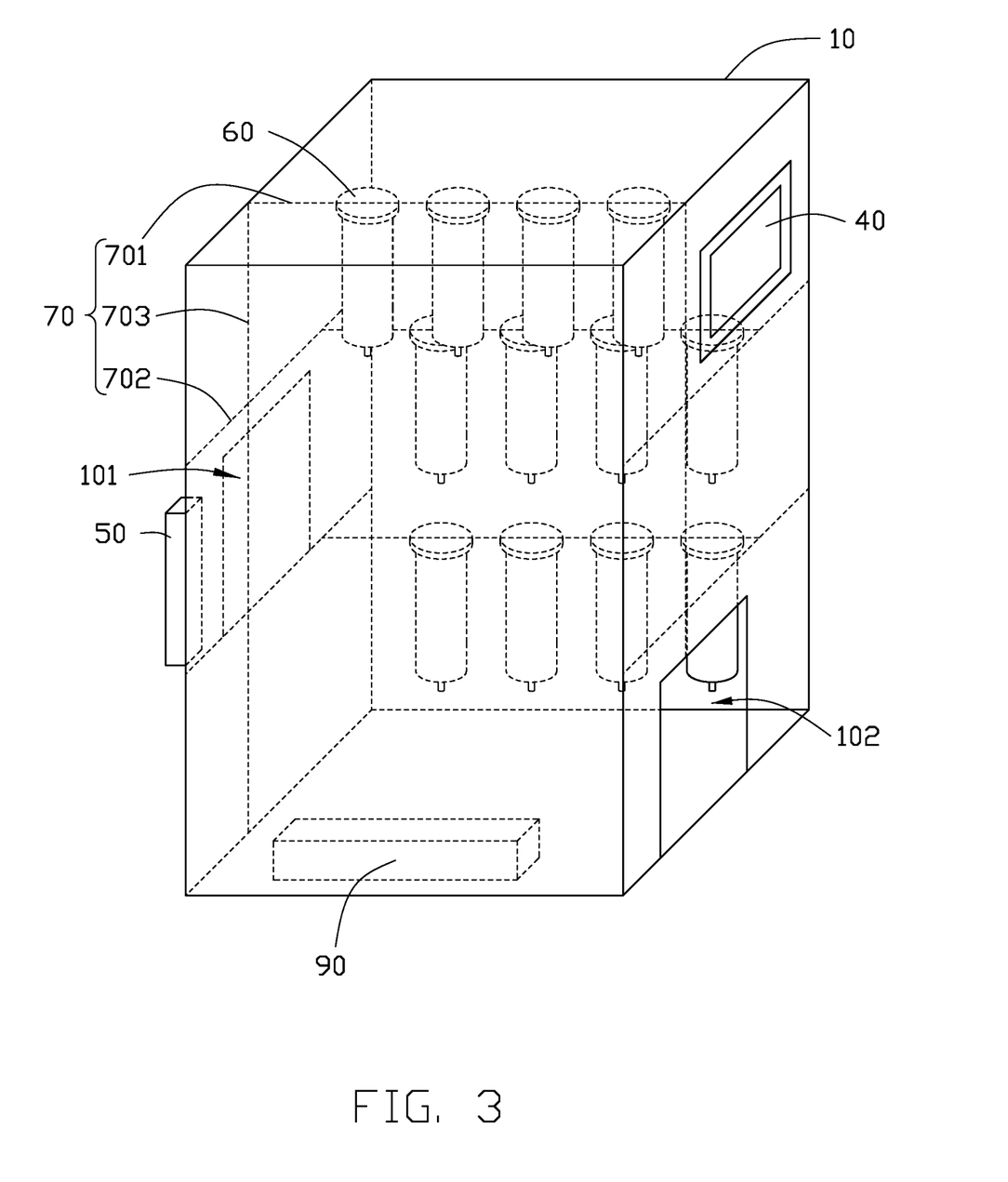
FIG. 3 is a schematic view of another embodiment of an electronic device according to the present disclosure.

Referring to FIG. 3, in another embodiment, the casing 10 is a cabinet type, and the transmission track 70 is a shelf type and is arranged on an inner wall of the casing 10. The inlet 101 is arranged at one side of the casing 10, and the outlet 102 is arranged at a bottom of the other side of the casing 10.

In the another embodiment, the transmission track 70 includes at least one slide track 701, at least two transverse tracks 702, and at least two vertical tracks 703. The storage position 60 is arranged on the slide track 701. When the batches of materials are required to be removed from the storage position 60, the processor 20 controls the slide track 701 to slide along the transverse track 702 to a position of the vertical track 703, and then controls the slide track 701 to slide along the vertical track 703 to drive the storage position 60 to reach the bottom of the casing 10, so that the storage position 60 can align with the outlet 102 and release the batch of material to the position of the outlet 102.

When the batches of material are required to be stored into the storage position 60, the processor 20 controls the slide track 701 to slide along the transverse track 702 to the position of the vertical track 703, and then controls the slide track 701 to slide down along the vertical track 703 to drive the empty storage position 60 to the position of the inlet 101, so that the empty storage position 60 can receive the batch of material from the inlet 101.

In the another embodiment, the sensor 90 is arranged at the bottom of the casing 10, and the processor 20 determines the serial numbers of the storage locations 60 storing the batches of material according to the input batch information, and controls the transmission track 70 to drive the storage position 60 storing the batch of material to the bottom of the casing 10 and to align with the outlet 102, the sensor 90 detects the serial numbers of all of the storage positions 60 at the bottom of the casing 10, and transmits the detected serial numbers to the processor 20.

The processor 20 determines whether each of the detected serial numbers is the same as the serial number of the storage position 60 storing the batch of material. If the detected serial number is determined to be the same as the serial number of the storage position 60 storing the batch of material, the processor 20 obtains the storage time of the batch of material in the storage position 60 corresponding to the serial number. If the ranked value of the storage time of the batch of material in the storage position 60 is less than or equal to the value of the preset number, the processor 20 controls the storage position 60 to release the stored batch of material to the position of the outlet 102, so as to facilitate the user to take out the batch of material.

Figure 4:
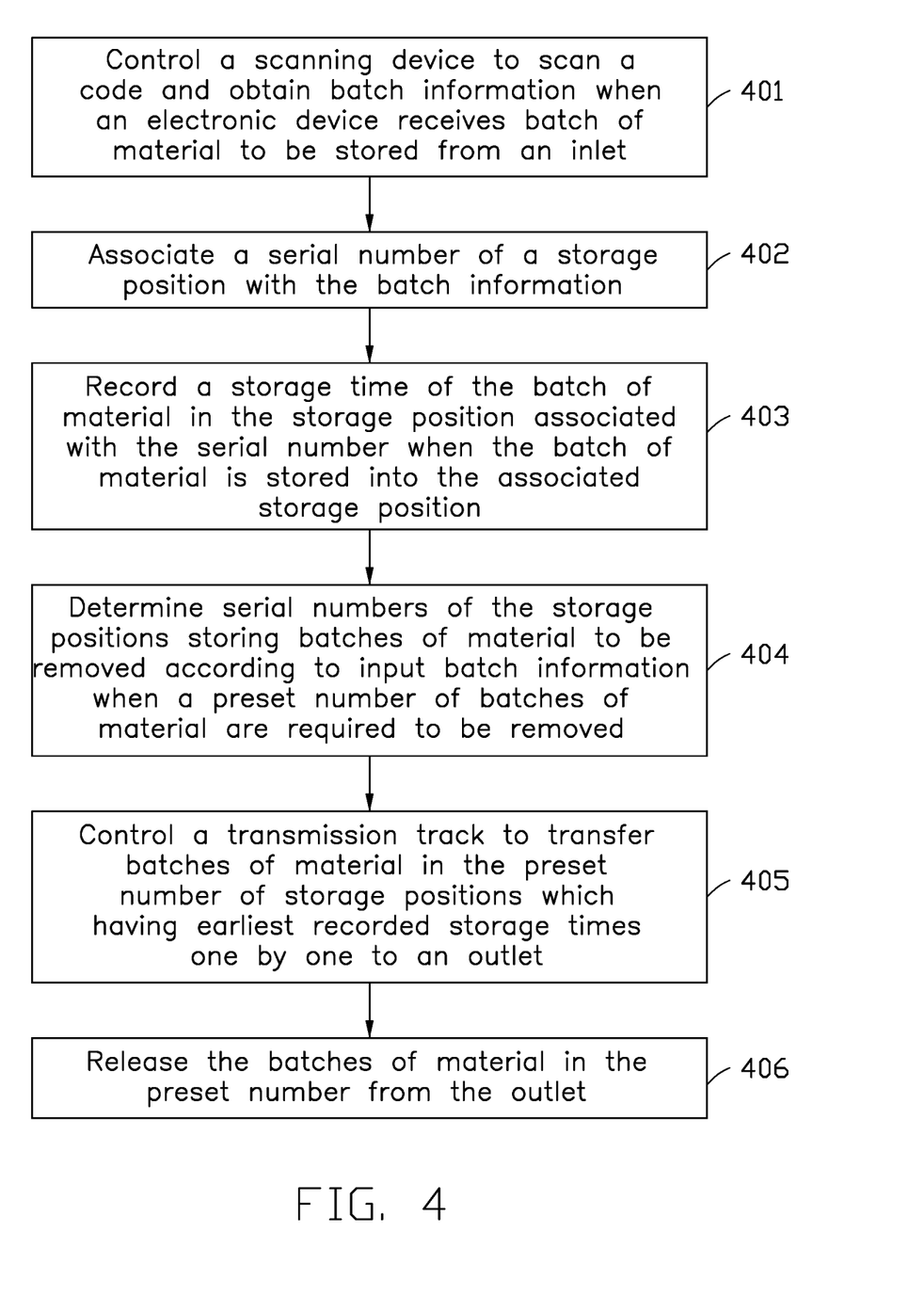
FIG. 4 illustrates a flowchart of an embodiment of a method for managing storage of materials according to the present disclosure.

FIG. 4 illustrates a flowchart of an embodiment of a method for managing storage of materials. The method is provided by way of example, as there are a variety of ways to carry out the method. The method described below can be carried out using the configurations illustrated in FIGS. 1-3, for example, and various elements of these figures are referenced in explaining the example method. Each block shown in FIG. 4 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 401.

At block 401, when the electronic device 1 receives the batches of material to be stored from the inlet 101, the processor 20 controls the scanning device 50 to scan the code of the batch of material and obtain the batch information, and stores the obtained batch information into the storage device 30.

At block 402, the processor 20 associates the serial number of the storage position 60 of one of the plurality of storage positions 60 with the batch information.

At block 403, the processor 20 records the storage time of the batch of material in the storage position 60 associated with the serial number when the batch of material is stored into the associated storage position 60, and stores the recorded storage time into the storage device 30.

At block 404, the processor 20 determines the serial numbers of the storage positions 60 which are storing batches of material to be removed according to the input batch information when a preset number of batches of material are required to be removed.

At block 405, the processor 20 controls the transmission track 70 to transfer the batches of material in the preset number of storage positions 60 which having earliest recorded storage times one by one to the outlet 102, so as to remove the preset number of the batches of material from the storage positions 60 through the outlet 102.

At block 406, the storage positions 60 releases the batches of material in the preset number from the outlet 102.

In one embodiment, the processor 20 controls the preset number of storage positions 60 which having earliest recorded storage times to release the batches of material in the preset number from the outlet 102.

In one embodiment, the method further includes: the processor 20 controls the transmission track to rotate and transfer at least one of the plurality of storage positions that is empty to a position of the inlet in response that the electronic device receives new batches of materials to be stored, and the processor 20 controls the transmission track to rotate and transfer at least one of the plurality of store positions which are storing the batches of material determined to be removed to a position of the outlet.

In one embodiment, the method further includes: the processor 20 deletes an association between the serial number of the storage position that released the batch of material and the batch information, and the processor 20 marks the storage position that released the stored material as the storage position that is empty.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being embodiments of the present disclosure.

What is claimed is:

1. An electronic device comprising:
   a casing comprising an inlet and an outlet;
   a scanning device;
   a transmission track;
   a plurality of storage positions arranged on the transmission track and configured to store batches of material;
   at least one processor; and
   a storage device coupled to the at least one processor and storing instructions for execution by the at least one processor to cause the at least one processor to:
   control the scanning device to scan a code and obtain batch information in response that the electronic device receives batch of material to be stored from the inlet;
   associate a serial number of one of the plurality of storage positions with the batch information;
   record a storage time of the batch of material in the storage position associated with the serial number in response that the batch of material is stored into the associated storage position;
   determine serial numbers of the storage positions of the plurality of storage positions which are storing batches of material to be removed according to the batch information in response that a preset number of batches of material are required to be removed; and
   according to the serial numbers of the storage positions which contain the batches of material determined to be removed, control the transmission track to transfer the batches of material in the preset number of the storage positions which having earliest recorded storage times one by one to the outlet; and
   release the batches of material in the preset number of the storage positions from the outlet.

2. The electronic device according to claim 1, wherein the casing and the transmission track are annular, the at least one processor is further caused to:
   control the transmission track to rotate and transfer at least one of the plurality of storage positions that is empty to a position of the inlet in response that the electronic device receives new batches of material to be stored; and
   control the transmission track to rotate and transfer at least one of the plurality of store positions which are storing the batches of material determined to be removed to a position of the outlet.

3. The electronic device according to claim 2, wherein further comprising:
   a sensor arranged at the position of the outlet;
   wherein the at least one processor is further caused to:
   control the transmission track to rotate and drive the plurality of storage positions to move after the serial numbers of the storage positions storing the batches of material to be removed are determined;
   control the sensor to detect the serial number of each of the plurality of the storage positions when each of the plurality of the storage positions is rotated to the sensor;
   determine whether the detected serial number is the same as the serial number of the storage position storing the batches of material;
   obtain the storage time of the batch of material in the storage position, in response that the serial number is the same as the serial number of the storage position storing the batches of material; and
   control the storage position to release the stored batch of material to the position of the outlet in response that a ranked value of the storage time of the stored batch of material in the storage position is less than or equal to a value of the preset number.

4. The electronic device according to claim 3, wherein the at least one processor is further caused to:
   delete an association between the serial number of the storage position that released the batch of material and the batch information; and
   mark the storage position that released the stored batch of material as the storage position that is empty.

5. The electronic device according to claim 1, wherein the casing is a cabinet, the transmission track is a shelf and is arranged on an inner wall of the casing, the inlet is arranged at one side of the casing, and the outlet is arranged at a bottom of the other side of the casing.

6. The electronic device according to claim 5, wherein the at least one processor is further caused to:
   control, in response that the batch of material is to be removed from the storage position, the transmission track to slide down and drive the storage position that stores the batch of material having the earliest recorded storage time to reach a bottom of the casing and to align with the outlet, so that the storage position releases the batch of material to a position of the outlet.

7. The electronic device according to claim 6, further comprising:
   a sensor arranged at a bottom of the casing;
   wherein the at least one processor is further caused to:
   control the transmission track to slide down and drive the storage position to reach the bottom of the casing and to align with the outlet after the serial numbers of the storage positions storing the batches of material to be removed are determined;
   control the sensor to detect the serial number of each of the plurality of the storage positions when each of the plurality of the storage positions reaches a position of the sensor;
   determine whether the detected serial number is the same as the serial number of the storage position storing the batch of material;
   obtain the storage time of the batch of material in the storage position, in response that the serial number is the same as the serial number of the storage position storing the batch of material; and
   control the storage position to release the stored batch of material to the position of the outlet in response that a ranked value of the storage time of the stored batch of material in the storage position is less than or equal to a value of the preset number.

8. A method for managing storage of materials implemented in an electronic device comprising:

controlling a scanning device to scan a code of batch of material to be stored and obtaining batch information in response that the electronic device receives the batch of material to be stored from an inlet of a casing;

associating a serial number of one of the plurality of storage positions with the batch information;

recording a storage time of the batch of material in the storage position associated with the serial number in response that the batch of material is stored into the associated storage position;

determining serial numbers of the storage positions of the plurality of storage positions which are storing batches of material to be removed according to the batch information in response that a preset number of batches of material are required to be removed; and according to the serial numbers of the storage positions which contain the batches of material determined to be removed, controlling a transmission track to transfer the batches of material in the preset number of the storage positions which having earliest recorded storage times one by one to an outlet of the casing; and releasing the batches of material in the preset number of the storage positions from the outlet.

9. The method according to claim 8, further comprising:
controlling the transmission track to rotate and transfer at least one of the plurality of storage positions that is empty to a position of the inlet in response that the electronic device receives new batches of material to be stored; and controlling the transmission track to rotate and transfer at least one of the plurality of store positions which are storing the batches of material determined to be removed to a position of the outlet.

10. The method according to claim 9, wherein the steps of controlling a transmission track to transfer the batches of material in the preset number of the storage positions which having earliest recorded storage times one by one to an outlet of the casing comprise:

controlling the transmission track to rotate and drive the plurality of storage positions to move after the serial numbers of the storage positions storing the batches of material to be removed are determined;

controlling a sensor arranged at the position of the outlet to detect the serial number of each of the plurality of the storage positions when each of the plurality of the storage positions is rotated to a position of the sensor;

determining whether the detected serial number is the same as the serial number of the storage position storing the batches of material;

obtaining the storage time of the batch of material in the storage position, in response that the serial number is the same as the serial number of the storage position storing the batches of material; and controlling the storage position to release the stored batch of material to the position of the outlet in response that a ranked value of the storage time of the stored batch of material in the storage position is less than or equal to a value of the preset number.

11. The method according to claim 10, further comprising:
deleting an association between the serial number of the storage position that released the batch of material and the batch information; and marking the storage position that released the stored batch of material as the storage position that is empty.

12. The method according to claim 8, wherein the steps of controlling a transmission track to transfer the batches of material in the preset number of the storage positions which having earliest recorded storage times one by one to an outlet of the casing comprise:

controlling, in response that the batch of material is to be removed from the storage position, the transmission track to slide down and drive the storage position that stores the batch of material having the earliest recorded storage time to reach a bottom of the casing and to align with the outlet, so that the storage position releases the batch of material to a position of the outlet.

13. The method according to claim 12, wherein the steps of controlling a transmission track to transfer the batches of material in the preset number of the storage positions which having earliest recorded storage times one by one to an outlet of the casing further comprise:

controlling the transmission track to slide down and drive the storage positions to reach the bottom of the casing and to align with the outlet after the serial numbers of the storage positions storing the batches of material to be removed are determined;

controlling a sensor arranged at bottom of the casing to detect the serial number of the storage position when the storage position reaches a position of the sensor;

determining whether the serial number is a serial number of the storage position storing the batch of material;

obtaining the storage time of the batch of material in the storage position, in response that the serial number is the serial number of the storage position storing the batch of material; and controlling the storage position to release the stored batch of material to the position of the outlet in response that a ranked value of the storage time of the stored batch of material in the storage position is less than or equal to a value of the preset number.

* * * * *